(12) United States Patent
Chen et al.

(10) Patent No.: US 8,419,274 B2
(45) Date of Patent: Apr. 16, 2013

(54) FULLY-ON-CHIP TEMPERATURE, PROCESS, AND VOLTAGE SENSOR SYSTEM

(75) Inventors: Shi-Wen Chen, Dashe Township, Kaohsiung County (TW); Ming-Hung Chang, Tainan (TW); Wei-Chih Hsieh, Taoyuan (TW); Wei Hwang, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 319 days.

(21) Appl. No.: 12/910,199

(22) Filed: Oct. 22, 2010

(65) Prior Publication Data

US 2012/0051395 A1    Mar. 1, 2012

(30) Foreign Application Priority Data

Sep. 1, 2010 (TW) ................................ 99129470 A

(51) Int. Cl.
*G01K 7/00* (2006.01)
(52) U.S. Cl.
USPC ........... 374/178; 374/170; 374/171; 374/172; 327/512; 327/513
(58) Field of Classification Search .................. 374/170, 374/178, 171, 172; 327/512, 513
See application file for complete search history.

(56) References Cited

U.S. PATENT DOCUMENTS

| | | | | |
|---|---|---|---|---|
| 3,713,033 | A * | 1/1973 | Frerking | 331/116 R |
| 5,873,053 | A * | 2/1999 | Pricer et al. | 702/130 |
| 6,853,259 | B2 * | 2/2005 | Norman et al. | 331/66 |
| 6,874,933 | B1 * | 4/2005 | Chan | 374/171 |
| 7,145,380 | B2 | 12/2006 | Hsu | |
| 7,216,064 | B1 * | 5/2007 | Pippin | 703/1 |
| 7,563,023 | B2 * | 7/2009 | Kuo et al. | 374/170 |
| 7,661,878 | B1 * | 2/2010 | Lall et al. | 374/170 |
| 2002/0181543 | A1 * | 12/2002 | Yin | 374/170 |
| 2003/0034848 | A1 * | 2/2003 | Norman et al. | 331/46 |
| 2007/0160113 | A1 * | 7/2007 | Kim et al. | 374/178 |
| 2007/0200635 | A1 * | 8/2007 | Meltzer | 331/16 |
| 2008/0136453 | A1 * | 6/2008 | Kuo et al. | 326/93 |
| 2008/0317097 | A1 * | 12/2008 | Sohn | 374/172 |
| 2009/0096495 | A1 * | 4/2009 | Keigo | 327/142 |
| 2009/0237142 | A1 * | 9/2009 | Matsuda et al. | 327/512 |
| 2010/0189160 | A1 * | 7/2010 | Kim et al. | 374/170 |
| 2011/0187419 | A1 * | 8/2011 | Ikenaga et al. | 327/117 |
| 2011/0241725 | A1 * | 10/2011 | Ikenaga et al. | 326/16 |

OTHER PUBLICATIONS

Chen et al. "A Time-to-Digital-Converter-Based CMOS Smart Temperature Sensor," IEEE Journal of Solid-State Circuites, Aug. 8, 2005, p. 1642-1648, vol. 40, No. 8.
Chen et al. "Fully On-Chip Temperature, Process, and Voltage Sensors," IEEE International Symposium on Circuits and Systems, May 30-Jun. 2, 2010, Paris, France.

* cited by examiner

*Primary Examiner* — Mirellys Jagan
(74) *Attorney, Agent, or Firm* — Muncy, Geissler, Olds & Lowe, PLLC

(57) ABSTRACT

A fully on-chip temperature, process, and voltage sensor includes a voltage sensor, a process sensor and a temperature sensor. The temperature sensor includes a bias current generator, a ring oscillator, a fixed pulse generator, an AND gate, and a first counter. The bias current generator generates an output current related to temperature according to the operating voltage of chip. The ring oscillator generates an oscillation signal according to the output current. The fixed pulse generator generates a fixed pulse signal. The AND gate is connected to the ring oscillator and the fixed pulse generator for performing a logic AND operation on the oscillation signal and the fixed pulse signal, and generating a temperature sensor signal.

10 Claims, 5 Drawing Sheets

FULLY-ON-CHIP TEMPERATURE, PROCESS, AND VOLTAGE SENSOR SYSTEM

BACKGROUND OF THE INVENTION

1. Field of the Invention

The invention relates generally to a sensor system and, more particularly, to a fully on-chip temperature, process, and voltage sensor system capable of operating in a low voltage environment.

2. Description of Related Art

With the advance of technology, electronic products related to wireless sensor are continuously applied into our daily life. However, electronic products related to wireless sensor all face the problems about how to reduce power consumption effectively. Electronic products can have prolonged lifetime of batteries only by reducing their power consumption. Therefore, how to design low power consumption circuits is getting more and more important.

In order to achieve low power consumption, circuits are usually operated in a voltage close to a sub-threshold voltage. However, when circuits are operated in an extremely low voltage, they are very sensitive to the variation of temperature, process and voltage, and may cause data error easily. Further, semiconductor manufactures are constantly facing new variation problems, such as circuit delay in capacity connection, signal integrity and reliability. Besides, variation noise in the operating environment also makes operating frequency and power consumption increase, resulting in an even greater variation in circuit performance.

In the known wireless sensor, temperature sensing can be accomplished by using analog-to-digital converters. However, the use of analog-to-digital converter inevitably makes noise and power consumption increase. Therefore, it is desirable to provide an improved sensor system to mitigate and/or obviate the aforementioned problems.

SUMMARY OF THE INVENTION

The object of the present invention is to provide a fully on-chip operating temperature, process, and voltage sensor system capable of operating in low voltage environment. The present invention can generate signals proportional to temperature with few inverters and without using any analog-to-digital converter. The present invention also has advantages of high sampling rate and low power consumption.

To achieve above object, the present invention provides an fully on-chip operating temperature, process, and voltage sensor system, which is configured in a chip. The system comprises: a voltage sensor for detecting an operating voltage of the chip so as to generate a voltage signal; a process sensor for detecting a process variation of the chip so as to generate a process indication signal; and a temperature sensor for detecting an operating temperature of the chip. The temperature sensor includes: a bias current gerator for generating an output current related to temperature according to the operating voltage of the chip; a first ring oscillator connected to the bias current generator for being driven by the output current to generate a first oscillation signal; a first fixed pulse generator for generating a first pulse signal with a fixed pulse width; a first AND gate connected to the first ring oscillator and the first fixed pulse generator to perform a logic AND operation on the first oscillation signal and the first pulse signal so as to generate a temperature sensing signal; and a first counter connected to the first AND gate for counting the temperature sensing signal so as to generate the temerature indication signal.

The output current generated by the bias current generator is proportional to the operating temerature of the chip, and the first oscillation signal generated from the first ring oscillator is proportional to the operating temperature.

Besides, the process sensor of the present invention includes: a second ring oscillator having an odd number of inverters to generate a second oscillation signal; a second fixed pulse generator for generating a second pulse signal with a fixed pulse width; a second AND gate connected to the second ring oscillator and the second fixed pulse generator for performing a logic AND operation on the second oscillation signal and the second pulse signal so as to generate a temperature sensing signal; and a second counter connected to the second AND gate for counting the process sensing signal so as to generate the process indication signal.

The voltage sensor of the present invention includes an inverter, a flip-flop, and an XOR gate for transforming the operation voltage to the voltage indication signal.

The bias current generator of the present invention includes a first PMOS transistor, a second PMOS transistor, a first NMOS transistor, a second NMOS transistor, and a resistor. The first NMOS transistor and the second NMOS transistor operate in a weak inversion zone. The output current flowing through the second PMOS transistor is:

$$I_{OUT} = \frac{mV_T}{R} \times \ln\left[\frac{W_{P1}W_{N2}}{W_{P2}W_{N1}}\right],$$

where R is a resistance of the resistor, $V_T$ is a thermal voltage, m is a constant, $W_{P1}$ is a width of first PMOS transistor, $W_{P2}$ is a width of second PMOS transistor, $W_{N1}$ is a width of first NMOS transistor, and $W_{N2}$ is a width of second NMOS transistor. From above description, it is known that $V_T$ is proportional to the temperture and the output current is proportional to the absolute temperature. The present invention further comprises a temperature compensation unit for receiving the voltage indication signal, the process indication signal, and the temperature indication signal to compensate the temperature indication signal.

DETAILED DESCRIPTION OF THE PREFERRED EMBODIMENT

Figure 1:
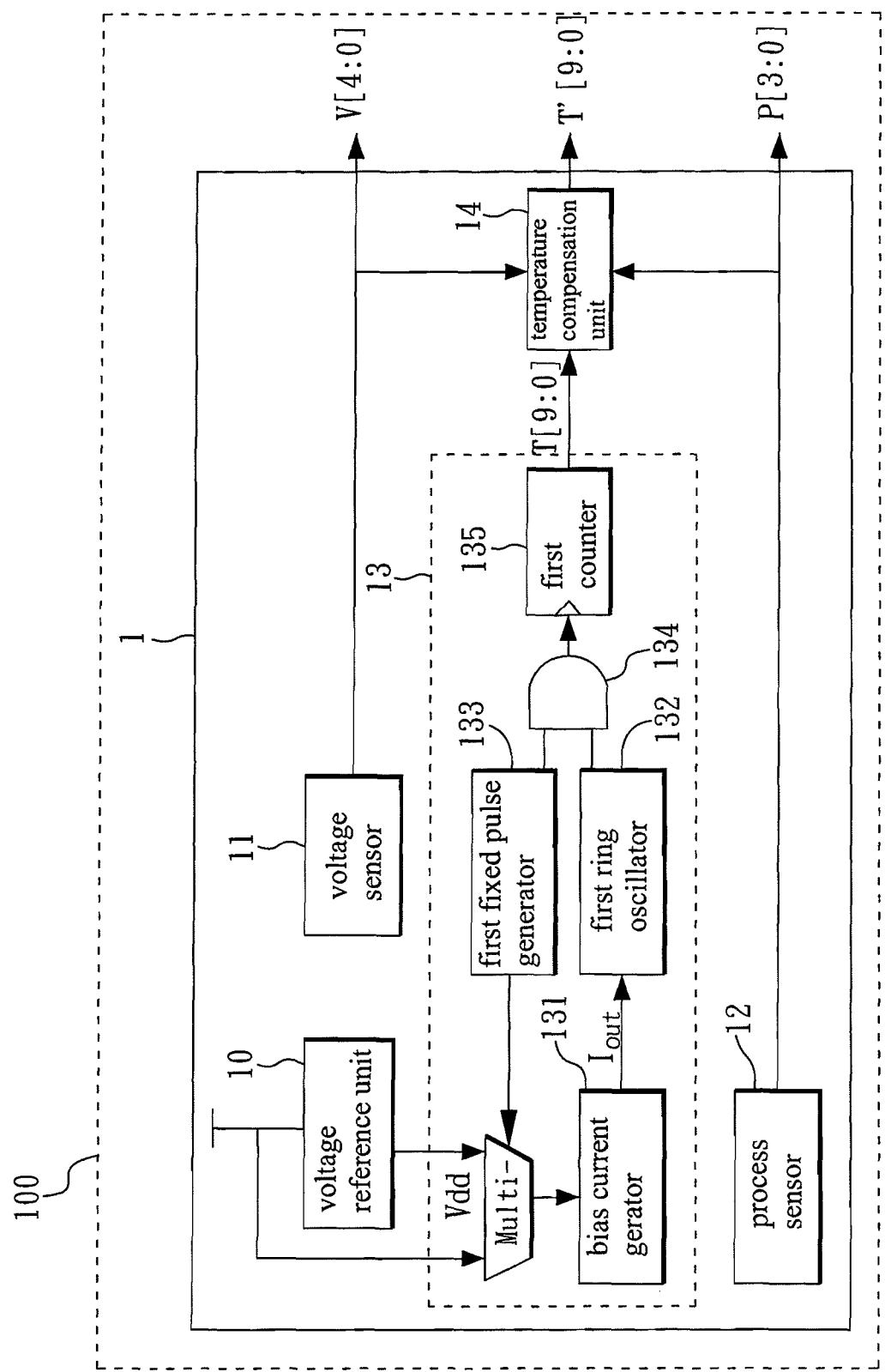
FIG. 1 is a system diagram in accordance with one preferred embodiment of the present invention.

With reference to FIG. 1, there is shown a system diagram in accordance with one preferred embodiment of the present invention. As shown, a fully on-chip operating temperature, process, and voltage sensor system 1 is configured in a chip 100. The system 1 comprises: a voltage reference unit 10, a voltage sensor 11, a process sensor 12, and a temperature sensor 13. The voltage reference unit 10 generates an operating voltage (Vdd) from an outside voltage for the temperature sensor 13. The voltage sensor 11 is used for detecting an operating voltage of the chip 100 to generate a voltage signal (V[4:0]). The process sensor 12 is used for detecting a process variation of the chip 100 to generate a process indication signal (P[3:0]). The temperature sensor 13 is used for detecting an operating temperature of the chip 100 to generate a temperature indication signal (T[9:0]). The present invention can further comprise a temperature compensation unit 14 for receiving the voltage indication signal, the process indication signal, and the temperature indication signal to compensate the temperature indication signal (T[9:0]), and generate a modified temperature indication signal (T' [9:0]).

In this embodiment, the temperature sensor 13 includes: a bias current gerator 131, a first ring oscillator 132, a first fixed pulse generator 133, a first AND gate 134, and a first counter 135. The bias current gerator 131 generates an output current ($I_{OUT}$) related to temperature according to the operating voltage of the chip 100. Preferably, the output current ($I_{OUT}$) generated from the first ring oscillator 131 is proportional to the operating temperature. The first ring oscillator 132 is connected to the bias current generator 131 for being driven by the output current ($I_{OUT}$) to generate a first oscillation signal. Preferably, the first oscillation signal is proportional to the operating temperature. The first fixed pulse generator 133 is used for generating a first pulse signal with a fixed pulse width. The first AND gate 134 is connected to the first ring oscillator 132 and the first fixed pulse generator 133 to perform a logic AND operation on the first oscillation signal and the first pulse signal so as to generate a temperature sensing signal. The first counter 135 is connected to the first AND gate 134 for counting the temperature sensing signal so as to generate the temerature indication signal (T[9:0]).

Figure 2:
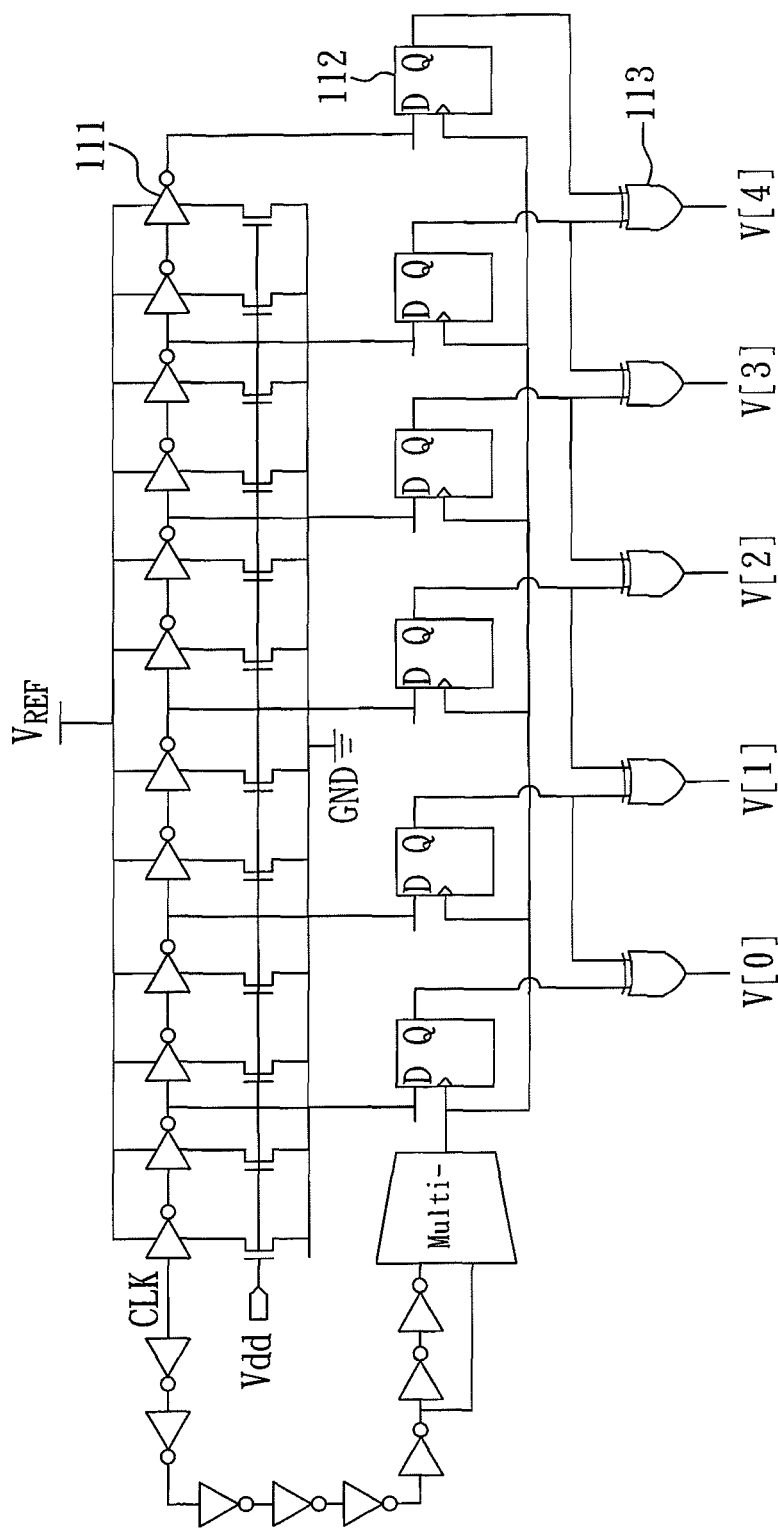
FIG. 2 is a system diagram of the voltage sensor of the present invention.

With reference to FIG. 2, there is shown a system diagram of the voltage sensor 11. As shown, The voltage sensor 11 in the present invention includes twelve inverters 111, six D-type flip-flops 112, and five XOR gates 123 for transforming the operating voltage (Vdd) into voltage indication signal (V[4:0]). Besides, as described above, the operating voltage (Vdd) belongs to a low voltage, ranged from 0.3 volt to 1 volt.

Figure 3:
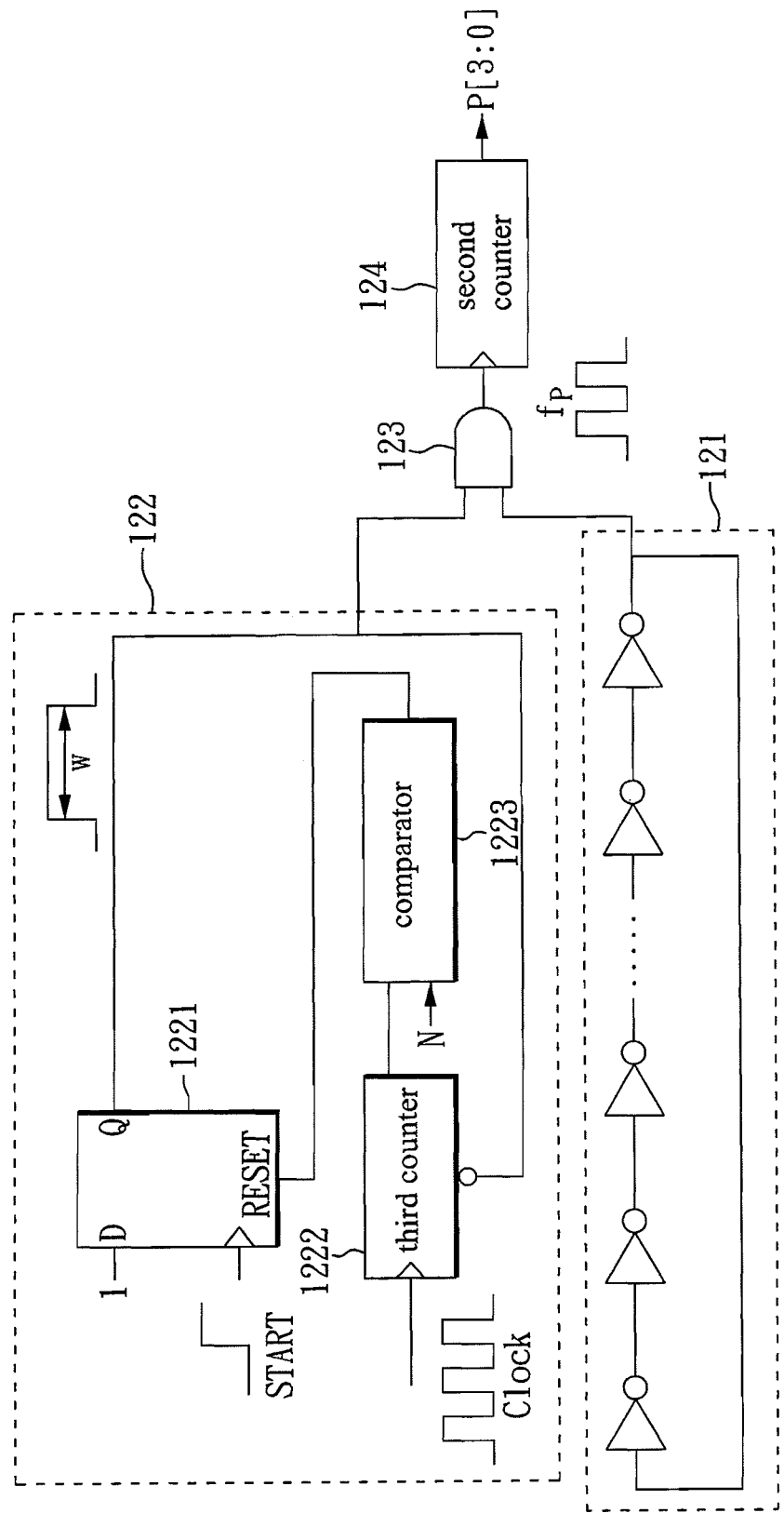
FIG. 3 is a system diagram of the process sensor of the present invention.

With reference to FIG. 3, there is shown a system diagram of the process sensor 12. As shown, the process sensor 12 includes a second ring oscillator 121, a second fixed pulse generator 122, a second AND gate 123, and a second counter 124. The second ring oscillator 121 has an odd number of inverters for generating a second oscillation signal. The second fixed pulse generator 122 has an D-type flip-flops 1221, a third counter 1222, and a comparator 1223. The second fixed pulse generator 122 generates a second pulse signal with a fixed pulse width W according to a clock signal inputted by the third counter 1222 and a number of N. The second AND gate 123 is connected to the second ring oscillator 121 and the second fixed pulse generator 122 for performing a logic AND operation on the second oscillation signal and the second pulse signal so as to generate a temperature sensing signal ($f_p$). The second counter 124 is connected to the second AND gate for counting the process sensing signal so as to generate the process indication signal (P[3:0]). Besides, the second oscillation signal generated by the second ring oscillator 121 has a frequency which is unrelated to the operating temperature of the chip 100 due to zero temperature coefficient.

Figure 4:
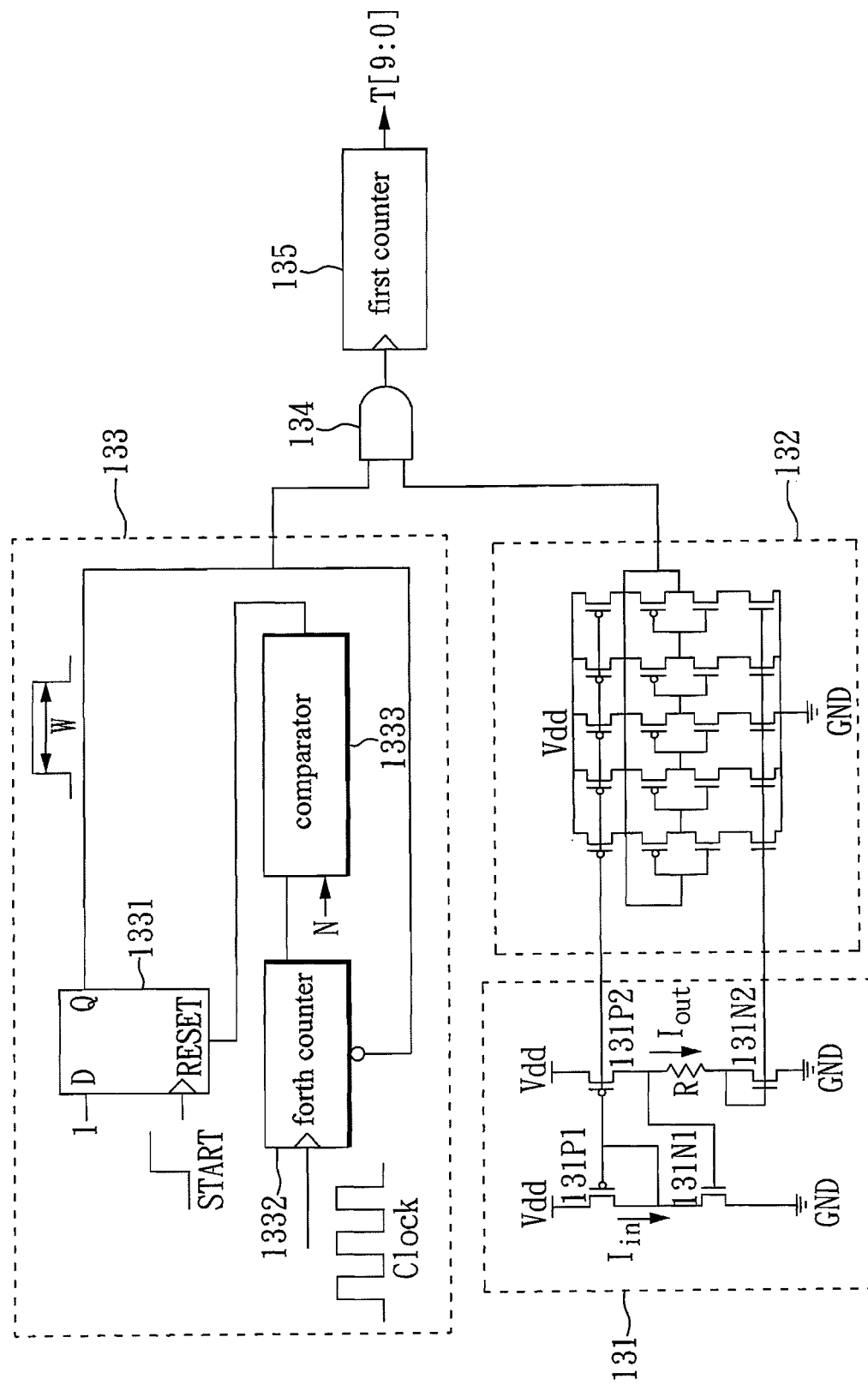
FIG. 4 is a system diagram of the temperature sensor of the present invention.

With reference to FIG. 4, there is shown a system diagram of the temperature sensor 13. As shown, the bias current generator 131 of the temperature sensor 13 includes a first PMOS transistor 131P1, a second PMOS transistor 131P2, a first NMOS transistor 131N1, a second NMOS transistor 131N2, and a resistor R. The first NMOS transistor 131N1 and the second NMOS transistor 131N2 operate in a weak inversion zone. The first ring oscillator 132 has an odd number of inverters. In this embodiment, the first ring oscillator 132 has five inverters. The first fixed pulse generator 133 has an D-type flip-flop 1331, a fourth counter 1332, and a comparator 1333. The first fixed pulse generator 133 generates a first pulse signal with a fixed pulse width W according to a clock signal inputted by the fourth counter 1332 and the number of N.

The present invention is characterized in that the output current ($I_{OUT}$) flowing through the second PMOS transistor 131P2 and the second NMOS transistor 131N2 is proportional to temperature.

The formula of the output current ($I_{OUT}$) is derived as bellow. First, the input current ($I_{IN}$) flowing through the first PMOS transistor 131P1 and the first NMOS transistor 131N1 is:

$$I_{IN} = \mu_0 C_{OX} \frac{W}{L}(m-1)(V_T)^2 \times e^{(V_{GS1} - V_{th}/mV_T)},$$

where $\mu_0$ is an effective mobility, $C_{OX}$ is a gate oxide capacitance per unit area, m is a constant, W is a width of tansistor, L is a length of tansistor, $V_T$ is thermal voltage, $V_{th}$ is a threshold voltage. $V_T$=kT/q, k is the Boltzmann constant, T(° K) is the absolute temperature, and q is the charge capacity.

Furthermore, the output current ($I_{OUT}$) flowing through the second PMOS transistor 131P2 and the second NMOS transistor 131N2 of the bias current generator 131 can be expressed as follows:

$$I_{OUT} = \mu_0 C_{OX} \frac{W}{L}(m-1)(V_T)^2 \times e^{(V_{GS2} - V_{th}/mV_T)}.$$

$$\text{Assumed } I_O = \mu_0 C_{OX} \frac{W}{L}(m-1)(V_T)^2,$$

the following equation can be obtained:

$$V_{GS1} = mV_T \times \ln\left[\frac{I_{IN}}{I_{ON1}}\right] + V_{th}, \text{ and}$$

$$V_{GS2} = mV_T \times \ln\left[\frac{I_{OUT}}{I_{ON2}}\right] + V_{th}.$$

Due to that the first PMOS transistor 131P1 and the second PMOS transistor 131P2 are current mirrors, the following equations can be obtained:

$$\frac{I_{P1}}{I_{P2}} = \frac{W_{P1}/L_{P1}}{W_{P2}/L_{P2}} = \frac{I_{IN}}{I_{OUT}}, \text{ and}$$

$$\frac{I_{ON1}}{I_{ON2}} = \frac{W_{N1}/L_{N1}}{W_{N2}/L_{N2}}.$$

By combining the above equations, the output current becomes:

$$I_{OUT} =$$

$$\frac{V_{GS1} - V_{GS2}}{R} = \frac{mV_T \times \ln\left[\frac{I_{IN} \times I_{ON2}}{I_{OUT} \times I_{ON1}}\right]}{R} = \frac{mV_T}{R} \times \ln\left[\frac{W_{P1}W_{N2}/L_{P1}L_{N2}}{W_{P2}W_{N1}/L_{P2}L_{N1}}\right]$$

if $L_{P1}$=$L_{P2}$=$L_{N1}$=$L_{N2}$, then:

$$I_{OUT} = \frac{mV_T}{R} \times \ln\left[\frac{W_{P1}W_{N2}}{W_{P2}W_{N1}}\right].$$

Due to that $V_T$ is proportional to the absolute temperature, the output current ($I_{OUT}$) is proportional to the temperature according to the above equations.

Figure 5:
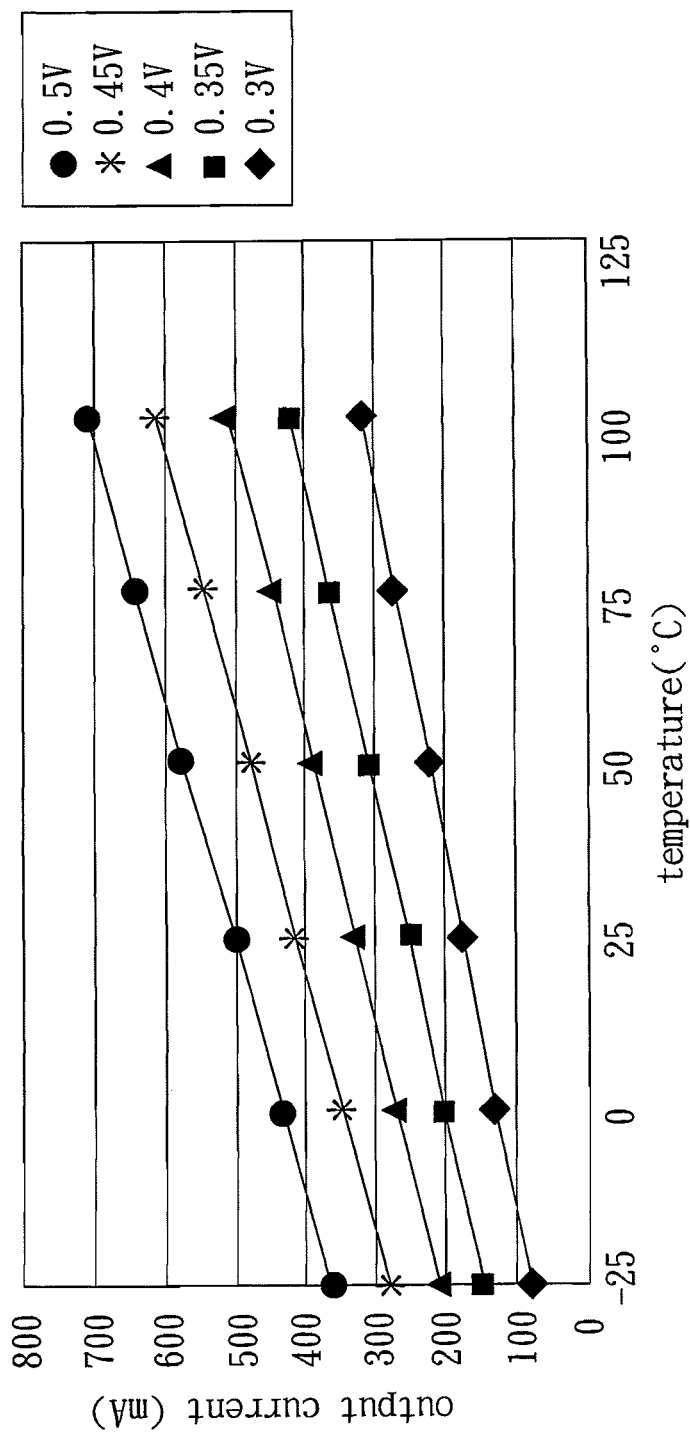
FIG. 5 is a diagram of the output current vs temperature when operating in different voltages.

With reference to FIG. 5, there is shown a diagram of the output current ($I_{OUT}$) vs temperature when operating in different voltages (0.3V, 0.35V, 0.4V, 0.45V, 0.5V). As shown, the output current ($I_{OUT}$) is proportional to the operating temperature of the chip 100 when the operating voltage is set between 0.3 volt to 1 volt.

In summary, the output current ($I_{OUT}$) flowing through the second PMOS transistor 131P2 and the second NMOS transistor 131N2 of the bias current generator 131 is proportional to the temperature. The output current ($I_{OUT}$) is transferred to the first ring oscillator 132 to generate the first oscillation signal. Therefore, the oscillation frequency of the first oscillation signal is proportional to the temperature. The first ring oscillator 132 further generates a sensing signal proportional to the temperature after a comparison of the first oscillation signal and the first pulse signal with a fixed pulse width.

According to the fully on-chip operating temperature, process, and voltage sensor system 1 provided by the present invention, the system 1 can generate current proportional to the temperature based on the operating temperature. Besides, the system 1 can compensate and regulate the measurement of temperature via the configuration of the voltage sensor 11 and the process sensor 12. The system 1 provided by the present invention can operate in low operating voltage (0.3-1.0 volt), and its power consumption is very low. It has practical values and characteristics distinguished from the prior art in perspectives of purpose, method, and effectiveness.

Although the present invention has been explained in relation to its preferred embodiment, it is to be understood that many other possible modifications and variations can be made without departing from the scope of the invention as hereinafter claimed.

What is claimed is:

1. A fully on-chip operating temperature, process, and voltage sensor system, which is configured in a chip, the system comprising:
a voltage sensor for detecting an operating voltage of the chip so as to generate a voltage indication signal;
a process sensor for detecting a process variation of the chip so as to generate a process indication signal;
a temperature sensor for detecting an operating temperature of the chip, the temperature sensor including:
a bias current generator for generating an output current related to temperature according to the operating voltage of the chip;
a first ring oscillator connected to the bias current generator for being driven by the output current to generate a first oscillation signal;
a first fixed pulse generator for generating a first pulse signal with a fixed pulse width;
a first AND gate connected to the first ring oscillator and the first fixed pulse generator to perform a logic AND operation on the first oscillation signal and the first pulse signal so as to generate a temperature sensing signal; and
a first counter connected to the first AND gate for counting the temperature sensing signal so as to generate the temperature indication signal; and
a temperature compensation unit for receiving the voltage indication signal, the process indication signal, and the temperature indication signal to compensate the temperature indication signal.

2. The fully on-chip operating temperature, process, and voltage sensor system as claimed in claim 1, wherein the output current generated by the bias current generator is proportional to the operating temperature of the chip.

3. The fully on-chip operating temperature, process, and voltage sensor system as claimed in claim 2, wherein the first oscillation signal generated from the first ring oscillator driven by the output current is proportional to the operating temperature.

4. The fully on-chip operating temperature, process, and voltage sensor system as claimed in claim 3, wherein the process sensor includes:
a second ring oscillator having an odd number of inverters to generate a second oscillation signal;
a second fixed pulse generator for generating a second pulse signal with a fixed pulse width;
a second AND gate connected to the second ring oscillator and the second fixed pulse generator for performing a logic AND operation on the second oscillation signal and the second pulse signal so as to generate a temperature sensing signal; and
a second counter connected to the second AND gate for counting the process sensing signal so as to generate the process indication signal.

5. The fully on-chip operating temperature, process, and voltage sensor system as claimed in claim 4, wherein the second oscillation signal generated by the second ring oscillator has a frequency which is unrelated to the operating temperature of the chip due to zero temperature coefficient.

6. The fully on-chip operating temperature, process, and voltage sensor system as claimed in claim 5, wherein the voltage sensor includes an inverter, a flip-flop, and an XOR gate for transforming the operation voltage to the voltage indication signal.

7. The fully on-chip operating temperature, process, and voltage sensor system as claimed in claim 6, wherein the bias current generator includes a first PMOS transistor, a second PMOS transistor, a first NMOS transistor, a second NMOS transistor, and a resistor.

8. The fully on-chip operating temperature, process, and voltage sensor system as claimed in claim 7, wherein the first NMOS transistor and the second NMOS transistor operate in a weak inversion zone.

9. The fully on-chip operating temperature, process, and voltage sensor system as claimed in claim 8, wherein the output current flowing through the second PMOS transistor is:

$$I_{OUT} = \frac{mV_T}{R} \times \ln\left[\frac{W_{P1}W_{N2}}{W_{P2}W_{N1}}\right],$$

where R is a resistance of the resistor, $V_T$ is a thermal voltage, m is a constant, $W_{P1}$ is a width of first PMOS transistor, $W_{P2}$ is a width of second PMOS transistor, $W_{N1}$ is a width of first NMOS transistor, and $W_{N2}$ is a width of second NMOS transistor.

10. The fully on-chip operating temperature, process, and voltage sensor system as claimed in claim 9, wherein the thermal voltage is proportional to Kelvin (absolute) temperature, and the output current is also proportional to Kelvin (absolute) temperature.

* * * * *